(12) United States Patent
Salter et al.

(10) Patent No.: US 12,030,354 B2
(45) Date of Patent: Jul. 9, 2024

(54) ELECTRIFIED VEHICLE WINCH AND WINCH OPERATING METHOD

(71) Applicant: Ford Global Technologies, LLC, Dearborn, MI (US)

(72) Inventors: Stuart C. Salter, White Lake, MI (US); William Wurz, San Francisco, CA (US); Ryan J. O'Gorman, Beverly Hills, MI (US); Peter Phung, Windsor (CA); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 462 days.

(21) Appl. No.: 17/369,175

(22) Filed: Jul. 7, 2021

(65) Prior Publication Data

US 2023/0009408 A1    Jan. 12, 2023

(51) Int. Cl.
| | |
|---|---|
| *B60D 1/18* | (2006.01) |
| *B60D 1/64* | (2006.01) |
| *B60L 50/60* | (2019.01) |
| *B60Q 1/14* | (2006.01) |
| *B66D 1/12* | (2006.01) |

(52) U.S. Cl.
CPC ............... *B60D 1/185* (2013.01); *B60D 1/64* (2013.01); *B60L 50/60* (2019.02); *B60Q 1/143* (2013.01); *B66D 1/12* (2013.01)

(58) Field of Classification Search
CPC .. B60D 1/185; B60D 1/64; B60D 1/18; B60L 50/60; B60L 1/003; B60L 1/00; B60Q 1/143; B60Q 1/50; B66D 1/12; B66D 1/00; B66D 1/46; B66D 2700/0141; Y02T 10/70; Y02T 10/7072; Y02T 90/14

USPC ......................................................... 320/109
See application file for complete search history.

(56) References Cited

U.S. PATENT DOCUMENTS

| | | | | |
|---|---|---|---|---|
| 7,543,798 | B2 * | 6/2009 | Cunningham | B66D 3/20 254/266 |
| 8,395,350 | B2 * | 3/2013 | Sloan | B60K 6/445 320/105 |
| 8,466,586 | B2 * | 6/2013 | Tarchinski | H01R 13/53 307/328 |
| 8,860,362 | B2 * | 10/2014 | Kamen | B60L 53/00 320/109 |
| 9,242,728 | B2 * | 1/2016 | Morrison | B64C 27/56 |
| 9,463,964 | B2 | 10/2016 | Heravi et al. | |

(Continued)

FOREIGN PATENT DOCUMENTS

| | | | | |
|---|---|---|---|---|
| CN | 108995547 | A * | 12/2018 | ............... A62C 3/16 |
| CN | 210502679 | U | 5/2020 | |

OTHER PUBLICATIONS

CN 108995547A Machine Translation (Year: 2018).*

(Continued)

*Primary Examiner* — M Baye Diao
(74) *Attorney, Agent, or Firm* — Vichit Chea; Carlson, Gaskey & Olds, P.C.

(57) ABSTRACT

An electrified vehicle winch includes, among other things, a winch and a charge port connector that connects to a charge port of an electrified vehicle. The winch is powered through the charge port connector. A winch operating method includes, among other things, operating a winch to move a load and, during the operating, powering the winch through a charge port of the electrified vehicle.

18 Claims, 4 Drawing Sheets

(56) References Cited

U.S. PATENT DOCUMENTS

| | | | |
|---|---|---|---|
| 9,987,892 B2* | 6/2018 | Ghannam | B60D 1/28 |
| 10,526,178 B2 | 1/2020 | Huang | |
| 11,660,919 B2* | 5/2023 | Tarasinski | A01B 76/00 |
| | | | 172/395 |
| 11,745,614 B2* | 9/2023 | O'Connor | B60L 53/57 |
| | | | 320/109 |
| 2006/0284153 A1 | 12/2006 | Burns | |
| 2012/0145980 A1* | 6/2012 | Harrison | B60D 1/02 |
| | | | 254/323 |
| 2018/0022174 A1* | 1/2018 | Stojkovic | B60P 1/64 |
| | | | 414/506 |
| 2018/0312275 A1* | 11/2018 | Mecklenburg | B64F 1/08 |
| 2019/0111793 A1* | 4/2019 | Christen | B60L 53/14 |
| 2020/0244091 A1 | 7/2020 | Ehlert et al. | |
| 2020/0298641 A1* | 9/2020 | Tarasinski | B60L 9/00 |
| 2021/0138855 A1* | 5/2021 | Fukayo | E02F 9/003 |
| 2021/0139299 A1* | 5/2021 | Crain | B66D 1/00 |
| 2022/0144605 A1* | 5/2022 | Lobo | B66D 1/12 |
| 2022/0266908 A1* | 8/2022 | Kemp | B62D 21/11 |
| 2023/0131483 A1* | 4/2023 | Cashdollar | H02J 7/0013 |
| | | | 320/109 |

OTHER PUBLICATIONS

Aicrane, Heavy Duty Electric Winch, retrieved from https://www.ellsencranes.com/heavy-duty-electric-winch/ on May 18, 2021.

Labonville, Norse 350 3 Point Hitch-30-60 HP-350W, retrieved from https://www.labonville.com/Norse-350-3-Point-Hitch--30-60-HP-_p_80.html on May 18, 2021.

Ramsey Winch, Patriot 15000—Ramsey Winch—Be Mighty, retrieved from https://ramseywinch.net/shop/applications/work-truck/patriot-profile-12000/ on May 18, 2021.

* cited by examiner

ELECTRIFIED VEHICLE WINCH AND WINCH OPERATING METHOD

TECHNICAL FIELD

This disclosure relates generally to a winch used in connection with a vehicle and, more particularly, to a winch that is powered through a charge port connector.

BACKGROUND

Some vehicles can be equipped with a winch. The winch can be used to pull the vehicle out of mud, snow, sand, etc. Some vehicles power the winch through a power takeoff. Some vehicles power the winch from a vehicle battery.

SUMMARY

An electrified vehicle winch assembly according to an exemplary aspect of the present disclosure includes, among other things, a winch and a charge port connector that connects to a charge port of an electrified vehicle. The winch is powered through the charge port connector.

In another example of the foregoing assembly, the winch is powered through the charge port connector by a traction battery.

Another example of any of the foregoing assemblies includes a traction battery pack that powers the winch through the charge port connector.

Another example of any of the foregoing assemblies includes an external power source that is external to the electrified vehicle. The external power source provides power to the winch through the electrified vehicle.

In another example of any of the foregoing assemblies, the external power source is grid power.

In another example of any of the foregoing assemblies, the external power source is another electrified vehicle.

Another example of any of the foregoing assemblies includes at least one light of the vehicle. The at least one light is configured to adjust in response to operation of the winch.

In another example of any of the foregoing assemblies, an intensity of the at least one light changes in response to changes in a load on the winch.

In another example of any of the foregoing assemblies, the winch is configured to mount to the electrified vehicle.

Another example of any of the foregoing assemblies includes a cord electrically connecting the winch to the charge port connector. The cord is outside the electrified vehicle when the winch is powered through the charge port connector.

A winch operating method according to yet another exemplary aspect of the present disclosure includes, among other things, operating a winch to move a load and, during the operating, powering the winch through a charge port of the electrified vehicle.

Another example of the foregoing method includes, during the powering, providing power to the winch from a traction battery pack of the electrified vehicle.

Another example of any of the foregoing winch operating methods includes, during the powering, providing power to the electrified vehicle from a power source that is external to the electrified vehicle.

In another example of any of the foregoing winch operating methods, the power source that is external to the electrified vehicle is another electrified vehicle.

Another example of any of the foregoing winch operating methods includes changing a lighting pattern of at least one light of the electrified vehicle in response to the operating.

In another example of any of the foregoing winch operating methods, changing the lighting pattern includes changing an intensity of light from the at least one light in response to the power flow to the winch.

In another example of any of the foregoing winch operating methods, the winch is secured to the electrified vehicle during the operating and the powering.

Another example of any of the foregoing winch operating methods includes electrically connecting the winch to the charge port using a cord and a charge port connector.

In another example of any of the foregoing winch operating methods, the cord and the charge port connector are outside the electrified vehicle during the operating and the powering.

In another example of any of the foregoing winch operating methods, a load on the winch is used to recharge a traction battery of an electrified vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a winch assembly having a winch and a charge port connector. The winch can be powered by an electrified vehicle through a charge port of the electrified vehicle. This approach provides adequate power to the winch without requiring substantial modifications to a vehicle.

Figure 1:
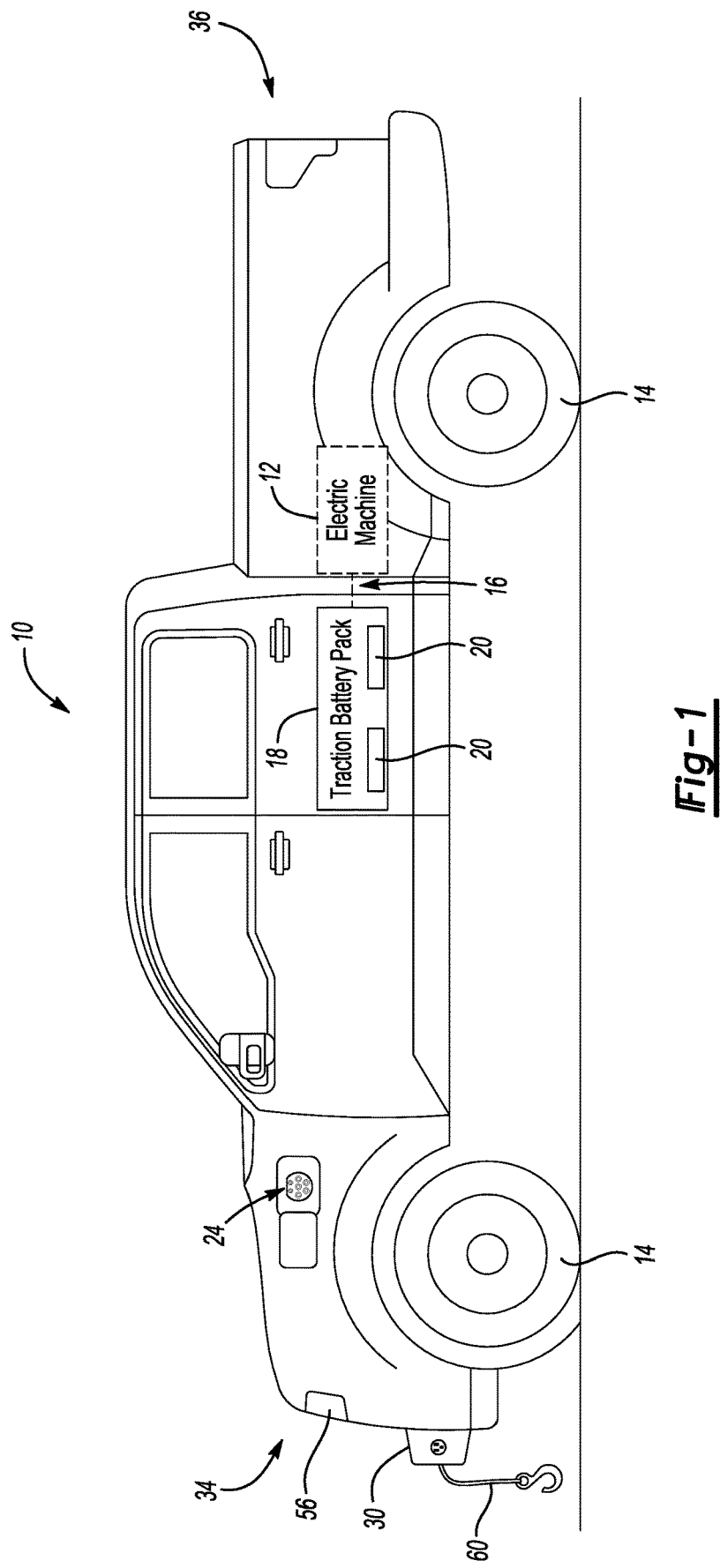
FIG. 1 shows a side view of a winch mounted to an electrified vehicle.

With reference to FIG. 1, an electrified vehicle 10 includes an electrified powertrain. In the exemplary embodiment, the electrified vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

In the embodiment illustrated in FIG. 1, the vehicle 10 is a full electric vehicle propelled through at least one electric machine 12 without any assistance from an internal combustion engine. The electric machine 12 may operate as an electric motor, an electric generator, or both. The electric machine 12, when powered, provides a rotational output torque to one or more drive wheels 14 through, for example, a transmission or gearbox (not shown).

A voltage bus 16 electrically connects the electric machine 12 to a battery pack 18. The traction battery pack 18 can be a high-voltage traction battery pack that includes one or more battery arrays 20 (i.e., battery assemblies or groupings of rechargeable battery cells capable of outputting electrical power to operate the electric machine and/or electrical loads of the electrified vehicle 10). The traction battery pack 18 can be recharged by connecting a charge cord to a charge port 24 of the electrified vehicle 10.

Figure 2:
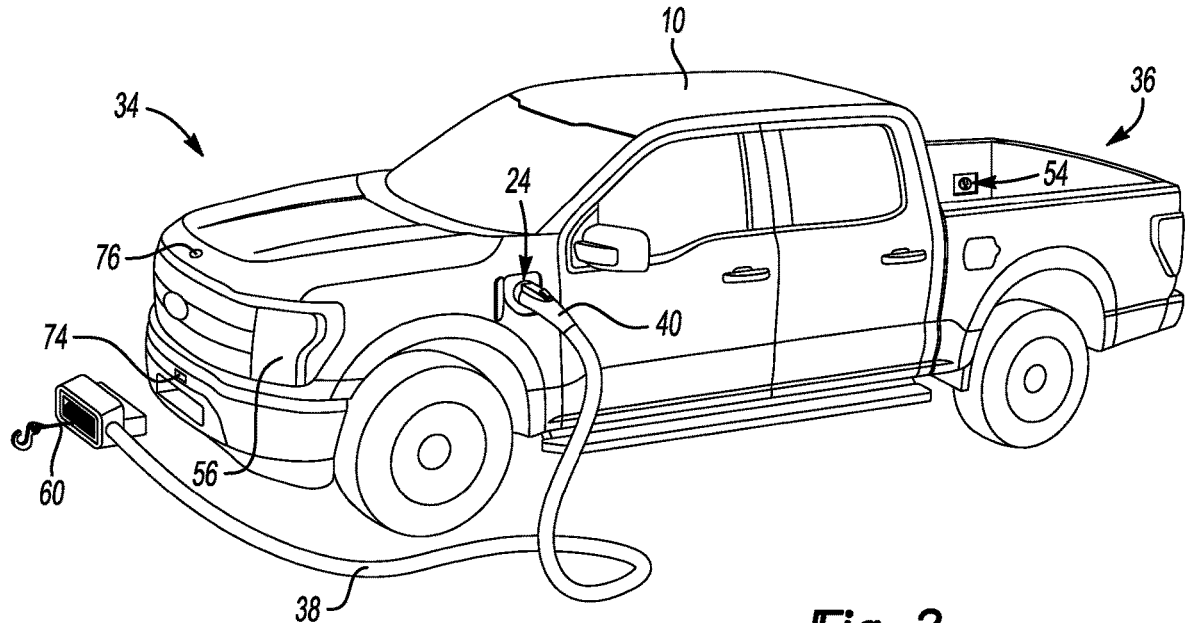
FIG. 2 illustrates a perspective view of the vehicle of FIG. 1 when the winch is not mounted to the vehicle.
Figure 3:
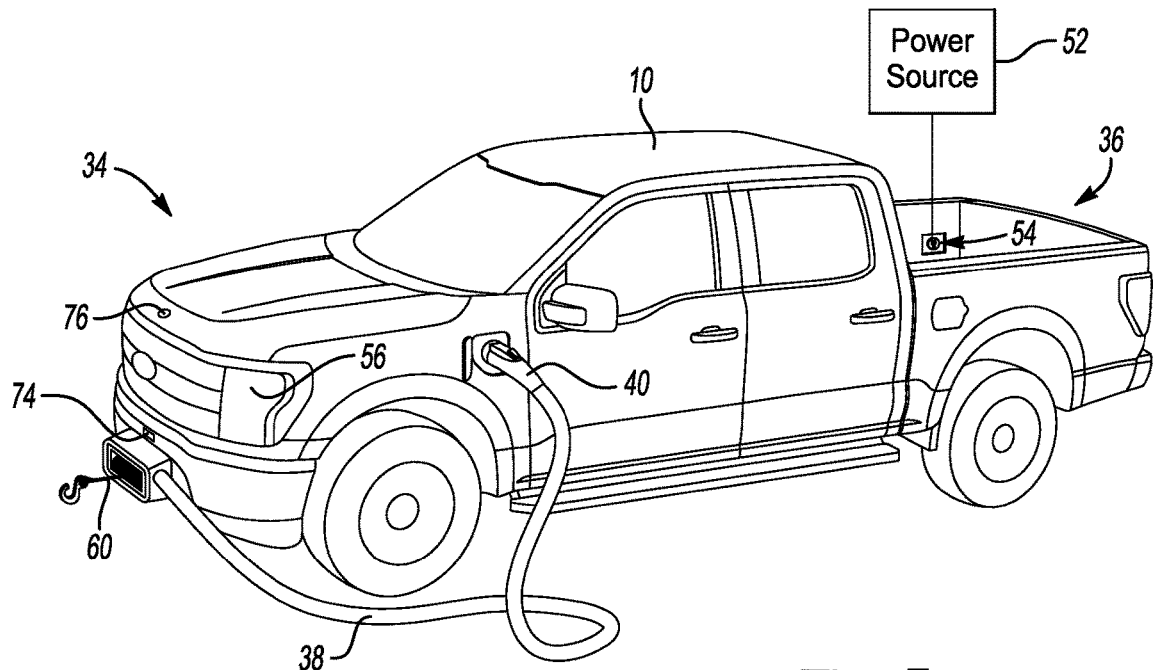
FIG. 3 illustrates a perspective view of FIG. 1 when the winch is mounted to the vehicle.

With reference now to FIGS. 2 and 3 and continued reference to FIG. 1, a winch 30 can be connected to the vehicle 10. In this example, the winch 30 is connected to the front end 34 of the vehicle 10. In another example, the winch 30 could be connected to another area of the vehicle 10, such as an aft end 36 of the vehicle 10.

The winch 30 is a powered winch. The winch 30 can include a DC motor that is used to drive the winch 30.

During operation of the winch 30, a cord 38, and a charge port connector 40 are used to electrically couple the winch 30 to the electrified vehicle 10. In particular, the charge port connector 40 couples directly to the charge port 24 of the electrified vehicle 10. Because power transfers to the winch 30 through the charge port connector 40, the winch 30 is powered through the charge port connector 40. Because the power transfers to the winch 30 through the charge port 24, the winch 30 is powered through the charge port 24.

Powering the winch 30 through the charge port connector 40 and the charge port 24 enables the winch 30 to be relatively simply transitioned from an uninstalled position, shown in FIG. 2, to an operational position, shown in FIG. 3. The winch 30 with the cord 38 and charge port connector 40 can be offered to users as an after-market item and incorporated relatively simply into the user's existing vehicle 10. If the winch 30 were instead powered entirely through the electrified vehicle 10, modifications within the vehicle 10 would potentially be required in order to power the winch 30 during operation.

Power supplied to the charge port connector 40—and ultimately to the winch 30—is from the traction battery pack 18. That is, the winch 30 is powered through the charge port connector 40 by the traction battery pack 18.

In some examples, a power source 52 that is external to the electrified vehicle 10 can provide power while the traction battery pack 18 is providing power to the winch 30. The power source 52 can be grid power, for example. In another example, the power source 52 could be another electrified vehicle. Providing power to the vehicle 10 from the external power source 52 while the traction battery pack 18 is powering the winch 30 can prevent a state of charge of the traction battery pack 18 from falling to a level inadequate for continuing to power the winch 30. The vehicle 10 can include a second charge port 54 that permits the vehicle 10 to be electrically coupled to the external power source 52 while the charge port 24 is electrically coupled to the charge port connector 40.

The vehicle 10 includes various lights, including headlights 56 at the front end 34 of the vehicle 10. As the winch 30 extends and retracts a cable 60, the headlights 56 of the vehicle 10 can be controlled to adjust in response to operation of the winch 30. For example, the headlights 56 may increase in intensity and/or brightness when power provided to the winch 30 increases due to, for example, a load on the winch 30 increasing. The lights of the vehicle 10 can provide a visual indication of a winch load rating being approached or exceeded. The lights can be used as a redundant notifier to an alert displayed within the vehicle 10 on a user's smartphone.

In FIG. 3, the winch 30 is shown in an operational position where the winch 30 is powered through the charge port connector 40 and the charge port 44 while the winch 30 is connected to the vehicle 10. In other examples, the winch 30 could be disconnected from the vehicle 10 while powered through the charge port connector 40 and the charge port 44. The winch 30 could however remain powered through the charge port 44 by keeping the charge port connector 40 coupled to the charge port 44. The winch 30 could then be used in areas where the winch 30 is spaced from the electrified vehicle 10.

It is also envisioned that the winch 30 could be designed to be regenerative so as the winch 30 lowers a load, the load power is converted into power to charge the traction battery pack 18. This can extend usage time of the traction battery pack 18.

Figure 4:
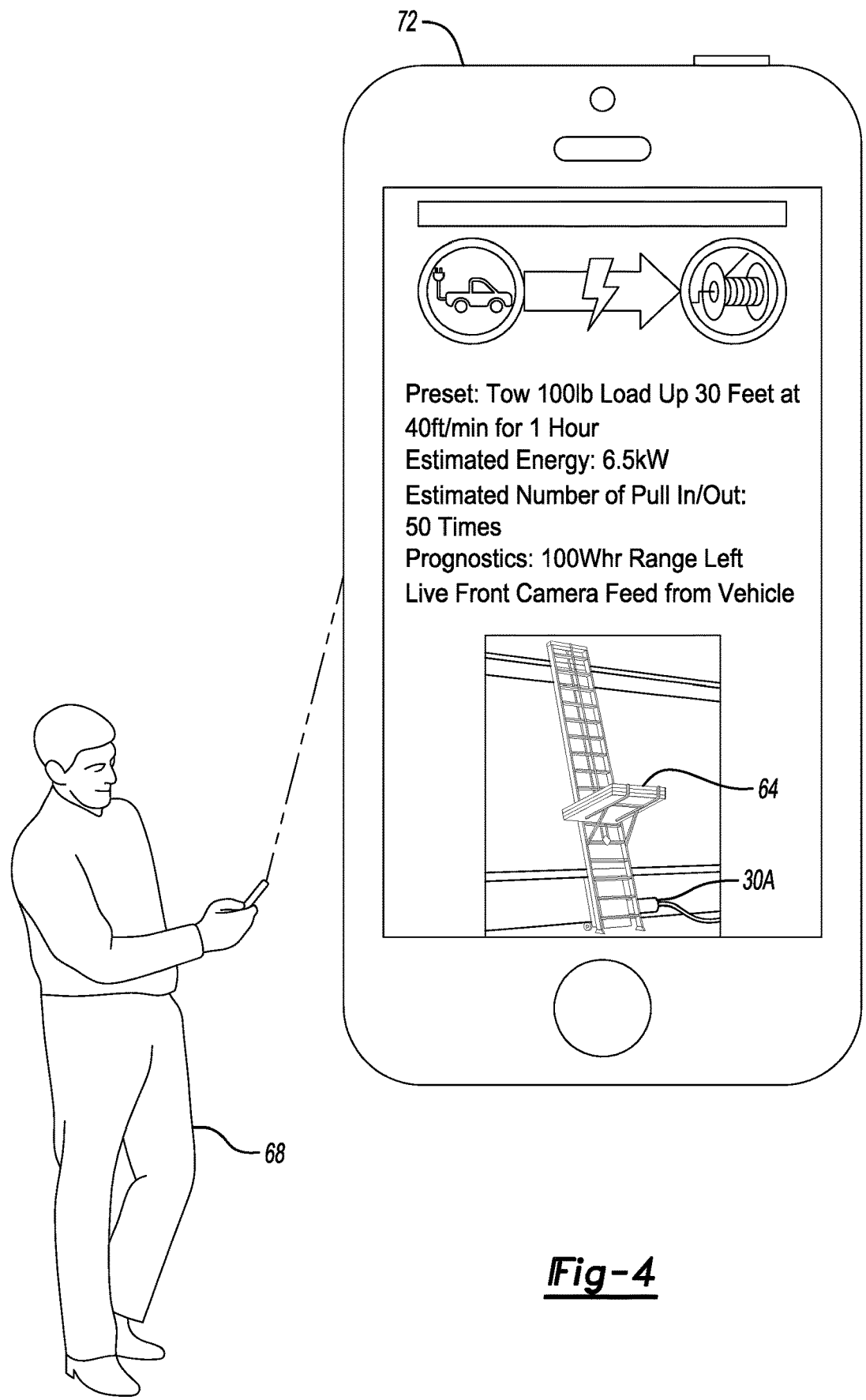
FIG. 4 illustrates an operator remotely viewing operation of a winch when the winch is operating and not mounted to the vehicle.

FIG. 4 shows a digital image of another example winch 30A that is utilized at a position spaced from a vehicle (not shown). The winch 30A is powered by a vehicle through the charge port while beings used to raise and lower a load 64.

A user 68 can utilize a monitoring device, such as a smartphone 72, to monitor the movement of the load 64 utilizing the winch 30A. In some examples, the winch 30A can include a camera to take images of areas surrounding the winch 30A. These images can be sent to the smartphone 72 to help the user monitor the load 64.

In some examples, the user 68 may be able to control operation of the winch 30A from a location remote from the winch 30A. The user 68 could control operation of the winch 30A through the smartphone 72 or another device.

Controlling and monitoring the winch 30A from a location remote from the winch 30A enables the user 68 to, among other things, maintain a distance from the load 64 and the winch 30A during operation of the winch 30A.

During operation of the winch 30 of FIGS. 1-3 or the winch 30A, prognostics (e.g. HV battery range, SOC, etc.) for the electrified vehicle 10 as well as on-board sensors (e.g. sound exciters/microphones, camera/radar sensors etc.) can be relied on to alert the user 68 of issues with the winch operation (e.g. wire cable tangling, earth blockage etc.).

Sound exciters 74 (such as a microphone) can be located in the vehicle 10 near the winch 30 or 30A. These exciters would be able to listen to the pull in/out windings and detect any audible discrepancies (e.g., listen to any sound deltas from expected winch cable under tension harmonics, or listen for "grinding" noises that may indicate tangled cable/knotting etc.) Additionally, the sound exciters would be used to pick up an audible command from the user 68. The winch 30 or 30A can operate in response to a shouted command of stop, for example.

Cameras 76 of the vehicle 10 can be used to provide perspective and enable the ability to live broadcast the video feed to, for example, a site supervisor's smartphone throughout the winch control process.

In some examples, Advanced Driver Assistance System sensors or RADAR sensors can measure changing environmental conditions as well as stop the process when a destination was reached or a pile up of earth or other blockage was being created.

Figure 5:
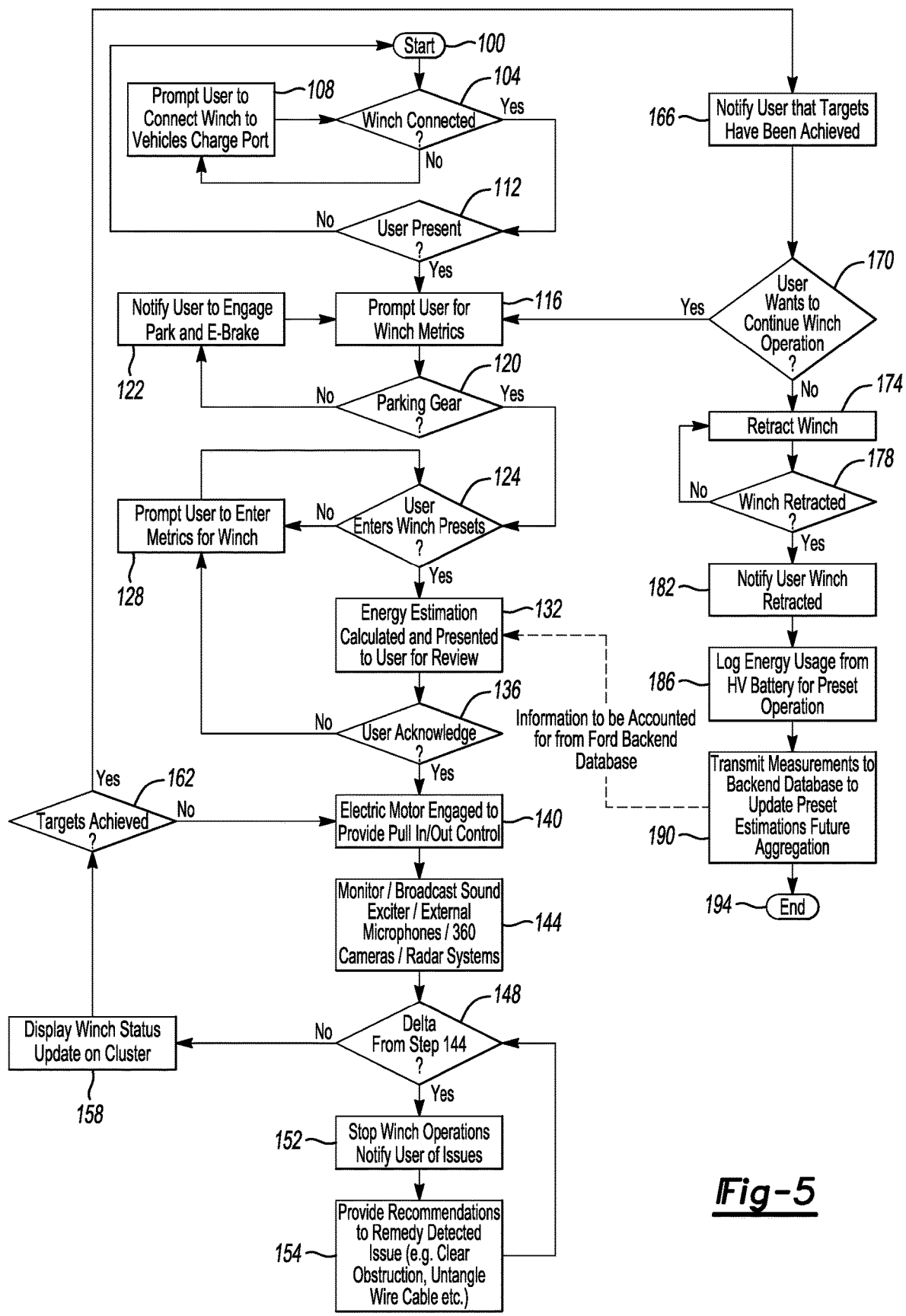
FIG. 5 illustrates a flow of an example method associated with controlling the winch of FIGS. 1-4.

With reference to FIG. 5, an example method of controlling the winches 30 and 30A can begin at a step 100, which asks, at a step 104, whether a winch, such as the winches 30, 30A, is connected to the vehicle 10. If not, the method prompts the user to connect the winch at a step 108.

If the winch is connected at step 104, the method moves to a step 112, which confirms whether or not a user is present. If not, the method moves back to the step 100. If yes, the method moves from the step 112 to a step 116 where the method prompts the user to provide winch metrics such as torque required, amount of movement required, etc. In some examples, the user inputs these metrics utilizing the smart device shown in FIG. 4.

The method then moves to a step 120 which confirms whether or not the vehicle 10 is a parking gear. If not, the method moves to the step 122 which notifies the user to engage park and E-brake of the vehicle. If, at the step 120, the vehicle is shifted to park, the method moves to the step 124 where the user enters winch presets. If the presets are not entered, the method moves to the step 128, which prompts the user to enter metrics for the winch.

If at the step 124, the user has entered the winch presets, the method moves to a step 132 which estimates energy potentially used by operating the winch in the desired way. The method, in the step 132, presents the estimate to the user for review.

The method then moves to the step 136, which requests that the user acknowledge the presets. If the user has acknowledged, the method moves to the step 140 where an electrical motor of the vehicle is engaged to provide pullout control for the winch.

The method then moves to the step 144 where operation of the winch is monitored utilizing various sensors and other devices. The method then moves to a step 148 which assesses, based on the monitoring in the step 144, the potential difference between operation of the winch and desired characteristics when the winch is operating.

If the monitoring information indicates that the winch has deviated substantially from the desired operating characteristics, the method moves to the step 152 where winch operation is stopped and the user is notified. Example situations that would lead to winch potentially stopping could include a tangled or knotted cable, obstructive blockage, etc.

The method then moves from a step 152 to a step 154 where recommendations are provided to remedy the issues provided to the user in the step 152. The method then returns to the step 148.

If the monitoring information in the step 148 indicates that the winch is operating as expected, the method moves from the step 148 to a step 158, which displays updates associated with operation of the winch on a cluster or, in other examples, a smart device.

The method moves from the step 158 to the step 162, which establishes whether or not the targets set by the user in the step 162 have been achieved. If yes, the method moves to the step 166 where the user is notified that the winch targets have been reached.

The method then moves to the step 170 where the user is asked (via a prompt on a smartphone, for example) whether or not operation of the winch should continue. If yes, the method moves from a step 170 back to the step 116 where the user is again prompted of the winch metric desired. If the user does not want to operate the winch any more at the step 170, the method moves to the step 174 where the winch is retracted.

Next, at a step 178, the method confirms whether the winch has been fully retracted. If yes, the method moves to the step 182 where the user is notified that the winch is retracted. The method then moves to the step 186, which logs energy usage associated with powering the winch from the, in this example, traction battery of the vehicle. The method then moves to the step 190, which transmits these measurements to a backend database. The measurements can be used within the database to update further preset estimations.

For example, the vehicle 10 may be able to estimate based on calculated use (e.g., customer inputs) with respect to state of charge of the traction battery pack 18. The vehicle 10 can then report to the user 68 the total time of available for usage of the winch 30A. For example, a preset of 100 pounds moving up a 30-foot tall ladder going at 40-feet/minute; repeating over 1-hour yields an estimated energy usage of 6.5 kW. By extension, the vehicle 10 can provide an estimation on number of times an operation can be supported based on the vehicle prognostics (e.g. number of times to pull a car out of a ditch vs uproot a bush or small tree or life materials (lumber/masonry) before charging is needed or a second vehicle would need to be deployed.

After operation of the winch, the estimated energy usage would be compared with actual and would be updated in next preset entry. Each "preset" entry/measurements would be transmitted to a database and will be cataloged/published for aggregated profile which could be shared to other users. This can further refine the estimations.

The method then ends at the step 194.

Features of the disclosed examples include a winch that can be powered by a traction battery, an external source of power, or both. Powering the winch in this way can avoid issues associated with powering the winch from a 12-Volt accessory battery. The winch can be driven with a DC motor powered by a DC power source. DC motors can be more efficient than AC motors. The winch allows for seamless connection while benefitting from larger battery reserves through the vehicle's HV power packs.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electrified vehicle winch assembly, comprising:
   a winch;
   a charge port connector that connects to a charge port of an electrified vehicle, the winch powered through the charge port connector; and
   a cord electrically connecting the winch to the charge port connector, the cord outside the electrified vehicle when the winch is powered through the charge port connector.

2. The electrified vehicle winch assembly of claim 1, wherein the winch is powered through the charge port connector by a traction battery.

3. The electrified vehicle winch assembly of claim 1, further comprising a traction battery that powers the winch through the charge port connector.

4. The electrified vehicle winch assembly of claim 1, further comprising at least one light of the vehicle, the at least one light is configured to adjust in response to operation of the winch.

5. The electrified vehicle winch assembly of claim 4, wherein an intensity of the light emitted from the at least one light changes in response to changes in a load on the winch.

6. The electrified vehicle winch assembly of claim 1, wherein the winch is configured to mount to the electrified vehicle.

7. An electrified vehicle winch assembly, comprising:
a winch;
a charge port connector that connects to a charge port of an electrified vehicle, the winch powered through the charge port connector; and
an external power source that is external to the electrified vehicle, the external power source provides power to the winch through the electrified vehicle.

8. The electrified vehicle winch assembly of claim 7, wherein the external power source is grid power.

9. The electrified vehicle winch assembly of claim 7, wherein the external power source is another electrified vehicle.

10. A winch operating method, comprising:
operating a winch to move a load;
during the operating, powering the winch through a charge port of an electrified vehicle; and
electrically connecting the winch to the charge port using a cord and a charge port connector.

11. The winch operating method of claim 10, further comprising, during the powering, providing power to the winch from a traction battery of the electrified vehicle.

12. The winch operating method of claim 10, further comprising, during the powering, providing power to the electrified vehicle from a power source that is external to the electrified vehicle.

13. The winch operating method of claim 12, wherein the power source that is external to the electrified vehicle is another electrified vehicle.

14. The winch operating method of claim 10, further comprising changing a lighting pattern of at least one light of the electrified vehicle in response to the operating.

15. The winch operating method of claim 14, wherein changing the lighting pattern includes changing an intensity of light from the at least one light in response to power flow to the winch.

16. The winch operating method of claim 10, wherein the winch is secured to the electrified vehicle during the operating and the powering.

17. The winch operating method of claim 10, wherein the cord and the charge port connector are outside the electrified vehicle during the operating and the powering.

18. The winch operating method of claim 10, wherein a load on the winch is used to recharge a traction battery of the electrified vehicle.

* * * * *